(12) United States Patent
Maleki et al.

(10) Patent No.: US 12,232,036 B2
(45) Date of Patent: Feb. 18, 2025

(54) METHODS FOR USER EQUIPMENT MEASUREMENTS ON ADDITIONAL REFERENCE SYMBOLS DURING IDLE MODE FOR POWER SAVING

(71) Applicant: Telefonaktiebolaget LM Ericsson (publ), Stockholm (SE)

(72) Inventors: Sina Maleki, Malmö (SE); Ali Nader, Malmö (SE); Andres Reial, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 377 days.

(21) Appl. No.: 17/798,929

(22) PCT Filed: Feb. 9, 2021

(86) PCT No.: PCT/EP2021/053068
§ 371 (c)(1),
(2) Date: Aug. 11, 2022

(87) PCT Pub. No.: WO2021/160606
PCT Pub. Date: Aug. 19, 2021

(65) Prior Publication Data
US 2023/0076100 A1    Mar. 9, 2023

Related U.S. Application Data

(60) Provisional application No. 62/976,444, filed on Feb. 14, 2020.

(51) Int. Cl.
*H04W 52/02* (2009.01)
*H04L 5/00* (2006.01)
*H04W 24/10* (2009.01)

(52) U.S. Cl.
CPC ....... *H04W 52/0229* (2013.01); *H04L 5/0048* (2013.01); *H04W 24/10* (2013.01)

(58) Field of Classification Search
CPC ............. H04W 52/0229; H04W 24/10; H04W 56/0015; H04L 5/0048; H04L 5/0078;
(Continued)

(56) References Cited

U.S. PATENT DOCUMENTS

| 2019/0215117 A1 | 7/2019 | Lee et al. |
| 2020/0382262 A1* | 12/2020 | Cheng ................. H04L 27/2613 |
| 2022/0352953 A1* | 11/2022 | Huang ................ H04W 68/005 |

FOREIGN PATENT DOCUMENTS

| CN | 110690947 A | 1/2020 |
| WO | 2019242862 A1 | 12/2019 |

OTHER PUBLICATIONS

International Search Report and Written Opinion dated Mar. 23, 2021 for International Patent Application No. PCT/EP2021/053068 filed Feb. 9, 2021, consisting of 14-pages.
(Continued)

*Primary Examiner* — Chae S Lee
(74) *Attorney, Agent, or Firm* — Weisberg I.P. Law, P.A.

(57) ABSTRACT

A wireless communication device having a receiving module, a transmitting module, and a processor which includes a determining module, and a processing module, wherein the wireless communication device is arranged to perform a method for power saving when operating in idle mode in a wireless communication system. Transmissions of a first set of reference symbols, RSs, and a second set of RSs are provided in the wireless communication system. The method includes estimating transmission pattern of the sec-
(Continued)

ond set of RSs, and determining when to wake up in the idle mode to perform associated measurements based on the estimated transmission pattern of the second set of RSs. The first set of RSs are provided periodically, and the second set of RSs are provided in any of periodic, semi-persistent or aperiodic transmissions.

20 Claims, 7 Drawing Sheets

(58) Field of Classification Search
CPC ........... H04L 27/2613; H04L 27/26132; H04L 5/0026; H04L 5/0032; H04L 5/0069; H04L 5/1469; H04L 5/0091; Y02D 30/70; H04B 17/382; H04B 17/318

See application file for complete search history.

(56) References Cited

OTHER PUBLICATIONS

3GPP TS 38.211 V15.8.0; 3rd Generation Partnership Project; Technical Specification Group Radio Access Network; NR; Physical channels and modulation (Release 15); Dec. 2019, consisting of 97-pages.
3GPP TS 38.214 V15.8.0; 3rd Generation Partnership Project; Technical Specification Group Radio Access Network; NR; Physical layer procedures for data (Release 15); Dec. 2019, consisting of 106-pages.
3GPP TS 38.331 V15.8.0; 3rd Generation Partnership Project; Technical Specification Group Radio Access Network; NR; Radio Resource Control (RRC) protocol specification (Release 15); Dec. 2019, consisting of 532-pages.
3GPP TSG RAN Meeting #86 RP-192569; Title: Discussion on UE power saving for Rel-17; Agenda Item: 9.1.1; Source: ZTE, Sanechips; Document for: Discussion; Date and Location: Dec. 9-12, 2019, Sitges, Spain, consisting of 5-pages.

* cited by examiner

METHODS FOR USER EQUIPMENT MEASUREMENTS ON ADDITIONAL REFERENCE SYMBOLS DURING IDLE MODE FOR POWER SAVING

CROSS-REFERENCE TO RELATED APPLICATIONS

This application is a Submission Under 35 U.S.C. § 371 for U.S. National Stage Patent Application of International Application No.: PCT/EP2021/053068, filed Feb. 9, 2021 entitled "METHODS FOR USER EQUIPMENT MEASUREMENTS ON ADDITIONAL REFERENCE SYMBOLS DURING IDLE MODE FOR POWER SAVING," which claims priority to U.S. Provisional Application No. 62/976,444, filed Feb. 14, 2020, entitled "METHODS FOR USER EQUIPMENT MEASUREMENTS ON ADDITIONAL REFERENCE SYMBOLS DURING IDLE MODE FOR POWER SAVING," the entireties of both of which are incorporated herein by reference.

TECHNICAL FIELD

Embodiments herein relate to a user equipment and methods therein for power saving. In particular, they relate to estimate transmission pattern of additional references symbols to perform measurement during idle mode in a wireless communication system.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE), have been completed within the 3rd Generation Partnership Project (3GPP) and this work continues in the coming 3GPP releases, for example to specify a Fifth Generation (5G) New Radio (NR) network.

The 3GPP is defining technical specifications for 5G NR. In release 15 (Rel-15) NR, a user equipment (UE) can be configured with up to four carrier bandwidth parts (BWPs) in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks (PRBs) are defined and numbered from 0 to $N_{BWP_i}^{size}-1$, where i is the index of the carrier bandwidth part. A resource block (RB) is defined as 12 consecutive subcarriers in the frequency domain.

Multiple orthogonal frequency-division multiplexing (OFDM) numerologies, $\mu$, are supported in NR as given by Table 1, where the subcarrier spacing, $\Delta f$, and the cyclic prefix for a carrier bandwidth part are configured by different higher layer parameters for downlink (DL) and uplink (UL), respectively.

TABLE 1

Supported transmission numerologies.

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Physical Channels

A downlink physical channel corresponds to a set of resource elements carrying information originating from higher layers. The following downlink physical channels are defined:
  Physical Downlink Shared Channel, PDSCH
  Physical Broadcast Channel, PBCH
  Physical Downlink Control Channel, PDCCH
  PDSCH is the main physical channel used for unicast downlink data transmission, but also for transmission of random access response (RAR), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined:
  Physical Uplink Shared Channel(PUSCH)
  Physical Uplink Control Channel (PUCCH)
  Physical Random Access Channel (PRACH)
  PUSCH is the uplink counterpart to the PDSCH. PUCCH is used by UEs to transmit uplink control information, including Hybrid automatic repeat request (HARQ) acknowledgements, channel state information reports, etc. PRACH is used for random access preamble transmission.

NR Reference Symbols

The ultra-lean design principle in NR aims to minimize the always-on transmissions that exist in earlier systems, e.g. LTE cell-specific reference signal (CRS) reference symbols. Instead, NR provides reference symbols such as Synchronization Signal Blocks (SSBs) on a periodic basis, e.g. by default once every 20 ms. In addition, for connected mode UEs, typically a set of reference symbols are provided for optimal link performance. Some of these reference symbols are clarified below.

Channel Status Information-Reference Signal (CSI-RS) for Tracking

A UE in Radio Resource Control (RRC) connected mode is expected to receive from the network (NW) a RRC layer UE specific configuration with a NZP-CSI-RS-ResourceSet message configured including a parameter trs-Info. For a NZP-CSI-RS-ResourceSet configured with the higher layer parameter trs-Info set to "true", the UE shall assume the antenna port with the same port index of the configured Non-zero power (NZP) CSI-RS resources in the NZP-CSI-RS-ResourceSet is the same.

For frequency range 1 (FR1), the UE may be configured with one or more NZP CSI-RS set(s), where a NZP-CSI-RS-ResourceSet consists of four periodic NZP CSI-RS resources in two consecutive slots with two periodic NZP CSI-RS resources in each slot. If no two consecutive slots are indicated as downlink slots by tdd-UL-DL-ConfigurationCommon message or tdd-UL-DL-ConfigDedicated message, then the UE may be configured with one or more NZP CSI-RS set(s), where a NZP-CSI-RS-ResourceSet consists of two periodic NZP CSI-RS resources in one slot.

For frequency range 2 (FR2), the UE may be configured with one or more NZP CSI-RS set(s), where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

A UE configured with NZP-CSI-RS-ResourceSet(s) configured with higher layer parameter trs-Info may have the CSI-RS resources configured as:

Periodic, with the CSI-RS resources in the NZP-CSI-RS-ResourceSet configured with same periodicity, bandwidth and subcarrier location Periodic CSI-RS resource in one set and aperiodic CSI-RS resources in a second set, with the aperiodic CSI-RS and periodic CSI-RS resource having the same bandwidth with same RB location and the aperiodic CSI-RS being 'QCL-Type-A' and 'QCL-Type-D', where applicable, with the periodic CSI-RS resources. For frequency range 2, the UE does not expect that the scheduling offset between the last symbol of the PDCCH carrying the triggering DCI and the first symbol of the aperiodic CSI-RS resources is smaller than the UE reported ThresholdSched-Offset. The UE shall expect that the periodic CSI-RS resource set and aperiodic CSI-RS resource set are configured with the same number of CSI-RS resources and with the same number of CSI-RS resources in a slot. For the aperiodic CSI-RS resource set, if triggered, and if the associated periodic CSI-RS resource set is configured with four periodic CSI-RS resources with two consecutive slots with two periodic CSI-RS resources in each slot, the higher layer parameter aperiodicTriggeringOffset indicates the triggering offset for the first slot for the first two CSI-RS resources in the set.

A UE does not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'.

A UE does not expect to be configured with a CSI-ReportConfig with the higher layer parameter reportQuantity set to other than 'none' for aperiodic NZP CSI-RS resource set configured with trs-Info.

A UE does not expect to be configured with a CSI-ReportConfig for periodic NZP CSI-RS resource set configured with trs-Info.

A UE does not expect to be configured with a NZP-CSI-RS-ResourceSet configured both with trs-Info and repetition.

Each CSI-RS resource, defined in Clause 7.4.1.5.3 of [4, TS 38.211], is configured by the higher layer parameter NZP-CSI-RS-Resource with the following restrictions:

the time-domain locations of the two CSI-RS resources in a slot, or of the four CSI-RS resources in two consecutive slots, which are the same across two consecutive slots, as defined by higher layer parameter CSI-RS-resourceMapping, is given by one of $l \in \{4,8\}$, $l \in \{5,9\}$, or $l \in \{6,10\}$ for frequency range 1 and frequency range 2, $l \in \{0,4\}$, $l \in \{1,5\}$, $l \in \{2,6\}$, $l \in \{3,7\}$, $l \in \{7,11\}$, $l \in \{8,12\}$ or $l \in \{9,13\}$ for frequency range 2.

a single port CSI-RS resource with density $_p$=3 given by Table 7.4.1.5.3-1 from [4, TS 38.211] and higher layer parameter density configured by CSI-RS-ResourceMapping.

the bandwidth of the CSI-RS resource, as given by the higher layer parameter freqBand configured by CSI-RS-ResourceMapping, is the minimum of 52 and $N_{BWP,i}^{size}$ resource blocks, or is equal to $N_{BWP,i}^{size}$ resource blocks. For operation with shared spectrum channel access, freqBand configured by CSI-RS-ResourceMapping, is the minimum of 48 and $N_{BWP,i}^{size}$ resource blocks, or is equal to $N_{BWP,i}^{size}$ resource blocks.

the UE is not expected to be configured with the periodicity of $2^\mu \times 10$ slots if the bandwidth of CSI-RS resource is larger than 52 resource blocks.

the periodicity and slot offset for periodic NZP CSI-RS resources, as given by the higher layer parameter periodicityAndOffset configured by NZP-CSI-RS-Resource, is one of $2^\mu X_p$ slots where $X_p$=10, 20, 40, or 80 and where p is defined in Clause 4.3 of [4, TS 38.211].

same powerControlOffset and powerControlOffsetSS given by NZP-CSI-RS-Resource value across all resources.

NZP CSI-RS

The UE can be configured with one or more NZP CSI-RS resource set configuration(s) as indicated by the higher layer parameters CSI-ResourceConfig, and NZP-CSI-RS-ResourceSet. Each NZP CSI-RS resource set consists of K≥1 NZP CSI-RS resource(s).

The parameters for which the UE shall assume non-zero transmission power for CSI-RS resource are configured via the higher layer parameter NZP-CSI-RS-Resource, CSI-ResourceConfig and NZP-CSI-RS-ResourceSet for each CSI-RS resource configuration can be referred to Rel. [4, TS 38.211].

All CSI-RS resources within one set are configured with same density and same number of CSI-RS ports, except for the NZP CSI-RS resources used for interference measurement.

The UE expects that all the CSI-RS resources of a resource set are configured with the same starting RB and number of RBs and the same code division multiplexing (CDM) values and pattern.

The bandwidth and initial common resource block (CRB) index of a CSI-RS resource within a BWP, as defined in Clause 7.4.1.5 of [4, TS 38.211], are determined based on the higher layer parameters nrofRBs and startingRB, respectively, within the CSI-FrequencyOccupation IE configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If startingRB<$N_{BWP}^{start}$, the UE shall assume that the initial CRB index of the CSI-RS resource is $N_{initialRB}$=otherwise $N_{initialRB}$=startingRB. If nrofRBs>$N_{BWP}^{size}$+$N_{BWP}^{start}$−$N_{initialRB}$, the UE shall assume that the bandwidth of the CSI-RS resource is $N_{CSI-RS}^{BW}$=>$N_{BWP}^{size}$+$N_{BWP}^{start}$−$N_{initialRB}$, otherwise $N_{CSI-RS}^{BW}$=nrofRBs. In all cases, the UE shall expect that $N_{CSI-RS}^{BW}$≥min (24, $N_{BWP}^{size}$).

The following are short explanations for some IE parameters, for detailed information, see TS 38.214.

The IE NZP-CSI-RS-Resource is used to configure Non-Zero-Power (NZP) CSI-RS transmitted in the cell where the IE is included, which the UE may be configured to measure on.

The IE NZP-CSI-RS-ResourceId is used to identify one NZP-CSI-RS-Resource.

The IE NZP-CSI-RS-ResourceSet is a set of Non-Zero-Power (NZP) CSI-RS resources (their IDs) and set-specific parameters.

The IE NZP-CSI-RS-ResourceSetId is used to identify one NZP-CSI-RS-Resource Set.

The IE CSI-ResourceConfig defines a group of one or more NZP-CSI-RS-ResourceSet, CSI-IM-Resource Set and/or CSI-SSB-Resource Set.

The IE CSI-ResourceConfigId is used to identify a CSI-ResourceConfig.

The IE CSI-ResourcePeriodicityAndOffset is used to configure a periodicity and a corresponding offset for periodic and semi-persistent CSI resources, and for periodic and semi-persistent reporting on PUCCH. Both the periodicity and the offset are given in number of slots. The periodicity value slots4 corresponds to 4 slots, slots5 corresponds to 5 slots, and so on.

The IE CSI-RS-ResourceConfigMobility is used to configure CSI-RS based RRM measurements.

The IE CSI-RS-ResourceMapping is used to configure the resource element mapping of a CSI-RS resource in time- and frequency domain.

In NR, connected mode, a UE is provided either with periodic, semi-periodic or aperiodic CSI-RS/TRS, i.e. Tracking reference signals or CSI RS for tracking, so it can measure the channel qualities, and/or track the reference signal in order to fine tune its time and frequency synchronization. This mechanism is only specified for the RRC_Connected mode. The UE needs to rely on SSB measurements during RRC_Idle or Inactive mode for e.g. Automatic Gain Control (AGC) and sync purposes and for other functions. The default operation is that the UE wakes up at least two SSBs before a Paging Occasion (PO), and at the first one it performs AGC, and at the second performs Automatic Frequency Control (AFC) and timing synch before monitoring the PO.

The problem with relying on SSBs is that SSBs have relatively long time intervals, e.g. 20 ms, and sometimes the UE may need to stay away from deep sleep for a long total time before it is able to e.g. read its paging message after previous available SSB receptions, which in turn leads to a waste of UE power.

SUMMARY

There is thus a need for methods with which the UE can save power in idle mode.

As discussed above, besides SSBs there are other additional RSs or non-SSB RSs, e.g. CSI-RS/TRS and the UE is not aware of the potential existence of such RSs during RRC_Idle or Inactive mode. If the UE can continue exploiting potential CSI-RS/TRS or other non-SSB RSs during idle or inactive mode to perform required idle mode tasks, reduce the number of SSB instances to receive, between, then it can remain in deep sleep longer and thereby achieve higher power savings.

According to an aspect of embodiments herein, the object is achieved by a method performed in a UE for power savings in idle mode in a wireless communication system. Transmissions of a first set of reference symbols (RSs), e.g. SSBs, and a second set of RSs, i.e. non-SSB RSs, e.g. CSI-RS/TRS, are provided in the wireless communication system. The UE estimates transmission pattern of the second set of RSs and determines when to wake up in the idle mode to perform associated measurements based on the estimated transmission pattern of the second set of RSs.

The UE may gain knowledge regarding the second set of RSs, i.e. non-SSB RSs, during RRC_Idle or Inactive mode either through learning, or being informed directly from the NW node. When the UE have this knowledge, embodiments herein provide how the additional RSs can be exploited, particularly for power savings.

Embodiments herein provide methods and mechanisms with which the UE first learns that the network node keeps transmitting non-SSB RS, e.g., CSI-RS/TRS, even while the UE is in RRC_Idle or Inactive mode, and second it learns pattern of potential additional RSs, besides the SSBs, during RRC_Idle or Inactive mode. Finally, based on which of the RSs is closer to the PO, the UE decide to wake up and perform the associated measurements.

Embodiments herein also provide several methods and mechanisms with which the UE may exploit the presence of non-SSB RSs to obtain power savings. Methods are defined as:

Determining whether the available non-SSB RS may be advantageously used, e.g. by either considering the temporal order of occurrence of relevant SSB, TRS, and/or PO position, or by comparing the total energy consumption of the baseline and alternative, i.e. non-SSB RS-aided, action sequences. The baseline is UE just using SSBs for AGC and AFC with no aid from non-SSB RSs. The alternatives are UE performing AGC and AFC with aid from non-SSB RSs besides SSBs where SSBs and non-SSBs may have different temporal sequences.

Determining which RS combination, e.g. SSB, non-SSB or a combination of both, may be used for the required idle mode tasks.

The proposed solution provide UE with mechanisms to learn the configuration of additional RSs while in RRC Connected state, become aware of the presence and pattern of potential additional RSs, besides the SSBs, during RRC_Idle or Inactive mode, and then use this knowledge in order to achieve a higher power savings by enabling longer deep sleep phases.

The proposed solutions also provide UE with mechanisms to exploit the knowledge of non-SSB RSs during RRC_Idle or Inactive mode to perform required idle mode tasks to achieve lower power consumption.

Therefore, embodiments herein provide a method for UE for power saving by estimating and exploiting additional RSs provided in the wireless communication system.

BRIEF DESCRIPTION OF THE DRAWINGS

Examples of embodiments herein are described in more detail with reference to attached drawings in which:

FIG. 1 illustrating a wireless communication system in which embodiments herein may be implemented in;

DETAILED DESCRIPTION

Figure 1:
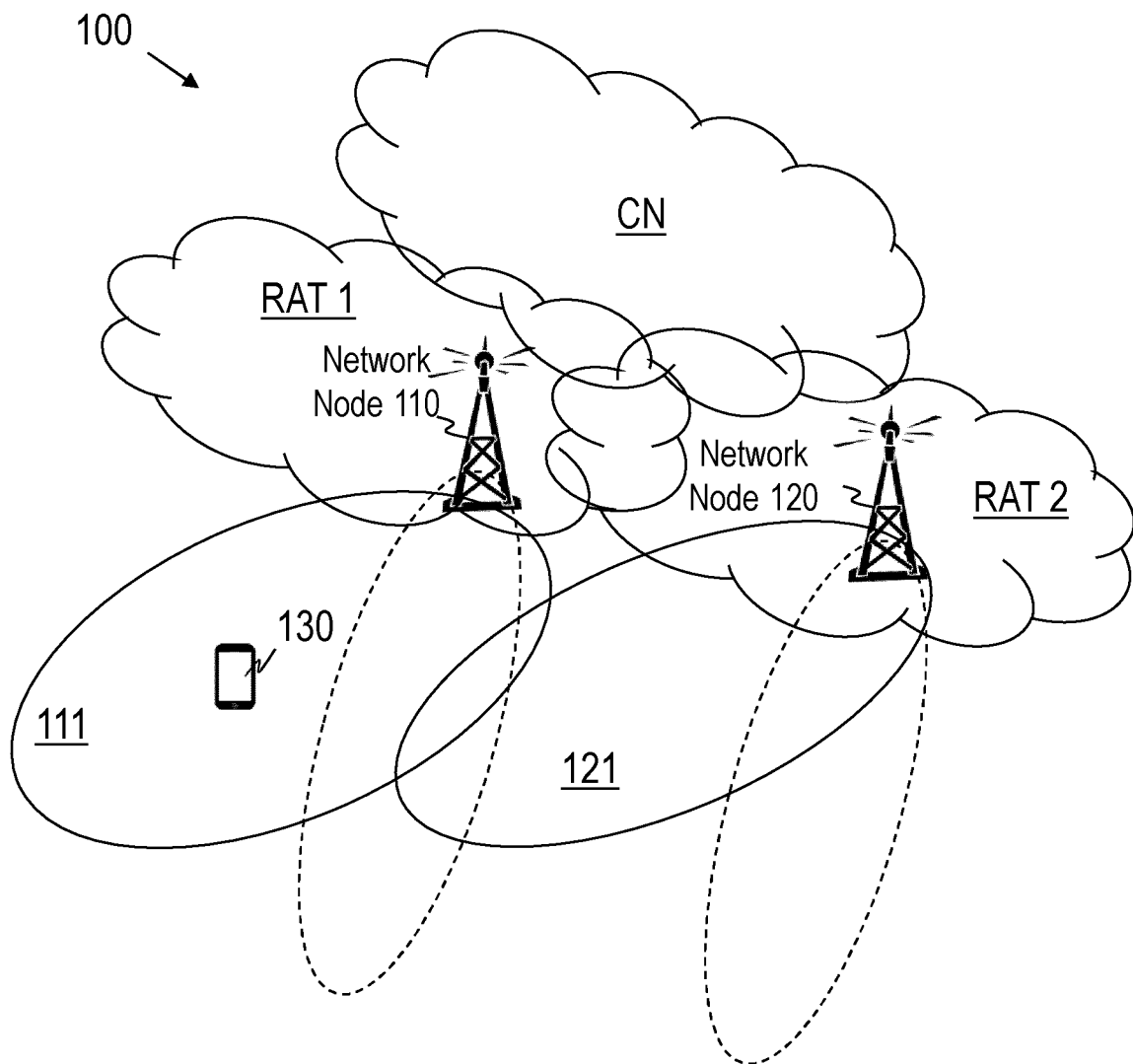

FIG. 1 is a schematic overview depicting a wireless communication system 100 in which embodiments herein may be implemented. The wireless communication system 100 may comprise any wireless system or cellular network, such as a Long Term Evolution (LTE) network, any $3^{rd}$ Generation Partnership Project (3GPP) cellular network, a Fourth Generation (4G) network, a Fifth Generation (5G) or NR network etc.

In the wireless communication system 100, wireless communication devices e.g. a user equipment 130 such as a mobile station or terminal, a wireless terminal communicate via one or more Radio Access Technology e.g. RAT 1, RAT 2 to one or more core networks (CN). It should be understood by the skilled in the art that "wireless communication device" is a non-limiting term which means any terminal, wireless communication terminal, user equipment, Machine Type Communication (MTC) device, IoT device, Device to Device (D2D) terminal, or node e.g. smart phone, laptop, mobile phone, sensor, relay, mobile tablets or even a small base station communicating within a cell. The terms "user equipment", "UE" and "wireless communication device" are used interchangeable herein.

Network nodes operate in the wireless communication networks such as a first network node 110 and a second network node 120. The first network node 110 provides radio coverage over a geographical area, a cell area or a service area 111, which may also be referred to as a beam or a beam group where the group of beams is covering the service area of a first radio access technology RAT 1, such as 5G, LTE, LTE-M, Wi-Fi or similar. The second network node 120 provides radio coverage over a geographical area, a service area 121, which may also be referred to as a beam or a beam group where the group of beams is covering the service area of a second radio access technology RAT 2, such as 5G, LTE, LTE-M, Wi-Fi or similar. The service areas 611 and 621 for e.g. LTE and NR, may overlap at some area. The first and second network nodes 110, 120 may be refereed as eNB, gNB etc.

In RRC_Connected state, a UE 130 is typically configured with a set of additional, in addition to SSB, non-SSB reference symbols (RSs) used for optimal link operations e.g., TRS or CSI-RS. The term non-SSB RS here may refer to CSI-RS or TRS, but other RS types may also be relevant. Such usage refers to the provision including configuration of the RSs by the gNB, the measurements and/or receiver tuning carried out by the UE on those RSs, and conditionally, based on a separate gNB-provided configuration, the reporting of the measurement carried out by the UE to the gNB leading to a mutual understanding of the link quality. Nevertheless, the NW node may choose to not turn off the non-SSB RS, if a UE transitions to RRC_Idle/Inactive. For the context of this application, from the UE viewpoint, the presence information regarding the non-SSB RSs are either explicitly provided by the NW node and thus guaranteed to be in specific time/frequency (T/F) resources, or it has to be detected or learned by the UE itself, and thus the latter becomes associated with a probability.

There are two alternatives for UE to detect or learn the presence information regarding non-SSB RSs.

Alternative 1: UE learning gNB behavior with regard to non-SSB RSs during RRC_Connected During RRC_Connected, the NW node may provide non-SSB RSs to the UE in periodic, semi-persistent, or aperiodic manner. In all cases, the NW node then provides information about characteristics of the RSs such as scrambling code, comb/interleaving and symbol patterns, Quasi-Colocation (QCL) information e.g. relation to other beams, antenna ports configuration, power offsets, etc. For the UE to know where and when in the time/frequency (T/F) resources the RSs occur, the UE also obtains the provision schedule for periodic and semi-persistent RSs during its connected mode operation.

In case of aperiodic RSs, the RSs may be provided in any T/F resources according to instantaneous NW node preferences upon which the UE is notified in a Downlink Control Information (DCI) imminent to provision, and thus in a general case, the provision schedule is not known to the UE in advance. This approach gives the NW node the flexibility to adapt the provision based on specific needs exemplified further below.

In one embodiment, the UE learns that even though the NW node has chosen to take an aperiodic configuration approach for some RSs, the NW node is still following a specific pattern when providing RSs. That is the RSs associated with a NW-ordered CSI report request arrive in periodic manner.

In a related embodiment, the UE learns that the aperiodic RSs triggering, e.g. CSI-RS trigger occurs in periodic manner with a specific period or other T/F parameters. For example, the NW node triggers the UE every 80 ms to report L1_RSRP, or every 40 ms for CSI-RS report. It may also learn that the frequency location is unchanged or changes according to a consistent pattern. For example, the CSI-RS is aperiodic, however, it comes periodically within a T/F window.

In yet another embodiment, the UE learns that the provision schedule and RS characteristics for a certain RS is connected to a UE behavior. For example, the UE may detect that RSs are provided and reports are requested by the NW node often, e.g. every 40th ms, with a dense RS configuration, e.g. number of symbols, interleaving pattern etc., and when the UE is moving at a high speed, e.g. above certain threshold, whereas less often e.g. every 80th ms, with a sparse configuration otherwise.

In another embodiment, the UE learns the specific NW node behavior with regard to RSs in a specific cell, a specific beam, BWP, FR ranges, and so on. For example, the NW node may behave the same or different, in different cells, beams, group of beams e.g. connected to a wide beam, BWP or FR range. For example, in FR1, the RSs may be less frequent than FR2 or the other way around. Or, in one cell, the RSs may come in the same T/F as the other cell, or a shifted version, or according to completely different pattern. The UE may then separately learn the patterns for the different frequency ranges. The UE will then store such information about the configuration schedule (T/F) and RS parameter configuration for the different cells/BWPs etc. The UE may also observe that RS configuration parameters, even though seemingly different, may be following a specific pattern, e.g. that the scrambling seed configuration used for the RSs in different cells are based on the cell identity.

Alternative 2: UE learning if non-SSB RSs are available during RRC_Idle/Inactive The objective with this aspect is that even though the aforementioned configurations of Alternative 1 are specifically provided for a UE in RRC_Connected mode, it is beneficial for UEs in RRC_Idle/Inactive mode to employ or enjoy the presence of these RSs as they might anyways be transmitted by the NW node.

In one embodiment, the UE may learn if periodic or semi-persistent non-SSB RSs are present during the time when the UE is in RRC_Idle/Inactive. For brevity, the terminology RRC_Idle/Inactive is abbreviated to "idle" from now on. For example, the UE may wake-up in idle at the time that the RSs are assumed to be present, to check if they are present or not. To do so, the UE may apply different detection techniques. For example, the UE may correlate the received signal with the expected RS pattern in time or frequency domain to verify if it contains a RS or no signal. For example, if the correlation result is above a specific threshold, the UE may note that this is a RS, but if not, then the UE assumes there is no RS signal present during idle time.

In one embodiment of the present invention, the UE may correlate with several assumed sequences e.g. comb/interleaving patterns, symbol density, etc. The UE may further utilize the learnings outlined in Alternative 1 for the most probable RS reference sequence correlation. The UE may e.g. based on its UE speed, or based on specific knowledge such as detected access points of any technology such as WiFi, assume that it is on a high-speed train probably together with other connected UEs in high-speed mode being provided with RSs and correlate with a sequence typically configured for such situation. Furthermore, the UE may utilize the information and assume periodicity of RS based on the information. Such information need not only be speed-based, but also time and/or location based. For example, in earlier aspects the UE might have learned that in heavy traffic areas, RSs are provided with a higher periodicity.

For the detector itself, the UE may further not wake up the whole receiver, but use a lower power receiver to wake-up at the expected non-SSB RSs arrival times to detect the presence or absence of the associated RSs. Furthermore, the UE may use previous SSB or non-SSB RS measurements for calibrating the detector.

The UE may further decide to perform this procedure one or more time during idle time, or perform the same in different cells, BWPs, beams, or FR ranges. For example, the UE may note that the non-SSB RSs, e.g. TRSs are present during idle time in one cell but not in another one, or they are present in FR2 but not in FR1, or vice versa, and so on.

According to some embodiments herein, the UE may perform this procedure more often in specific cells and/or during certain times of day. For example, it might be so that the NW node only provides such RSs only when there are UEs in RRC_Connected state and not otherwise. Therefore, the UE in idle state, may learn that during certain occasions e.g. busy hours, or cells e.g. busy locations, there is a higher probability that RSs are provided compared to other circumstances.

In another embodiment, the UE may apply the procedure described for detection of non-SSB RSs during idle time for periodic or semi-persistent RSs to aperiodic RSs as learned in Aspect 1. For example, the UE may wake-up during idle time, either the main receiver or a low power receiver with a low power detector, in T/F components where the UE would expect that the aperiodic RS arrives following the pattern learned in Aspect 1.

Furthermore, as in the case of periodic or semi-persistent RSs, the UE may learn whether the non-SSB RSs during idle time for aperiodic RSs remain present in a specific cell, BWP, beam, FR range and so on even when the given UE has left the connected mode. For example, the aperiodic RSs may be present during idle time for FR2 but not for FR1 or vice versa, or for both, or they may be present in one cell but not in another one, or they are present in all the cells, and so on.

In the examples above, the UE may further learn which of the specific RSs are present during idle time. For example, the UE may learn that TRS is present, but CSI-RS in general is not present, or that all of them are present, or a subset of them.

In an extension of Alternative 2, the UE may test for the presence of non-SSB RS in idle mode even when it has not obtained or learned RS configuration info in connected mode in the given cell. This approach may be used if the UE is mobile and changes its camping cell so that the current camping cell is no longer the last connected-mode cell for the UE. In such case, the UE utilizes its gained knowledge of Alternative 1 e.g. with respect to scrambling sequences assumed to be used for the new cell in case the scrambling sequence was based on cell identity. In one embodiment, the UE may attempt detecting the presence of RS in T/F locations and transmission patterns and/or according to scrambling and other resource set parameters or parameter combinations that were valid in its previous serving cells. If the previous serving cells had multiple different RS configurations, the UE may attempt detection according to multiple or all previously encountered patterns. In another embodiment, the UE may use the code info from previous serving cells but attempt detection in a wider range of T/F resource sets, e.g. in a given symbol number of multiple or all slots. The UE may perform energy detection to identify symbols where the RS are likely transmitted and attempt correlation detection in symbols whose energy level or detected energy pattern matches the expected RS energy or pattern.

Figure 2:
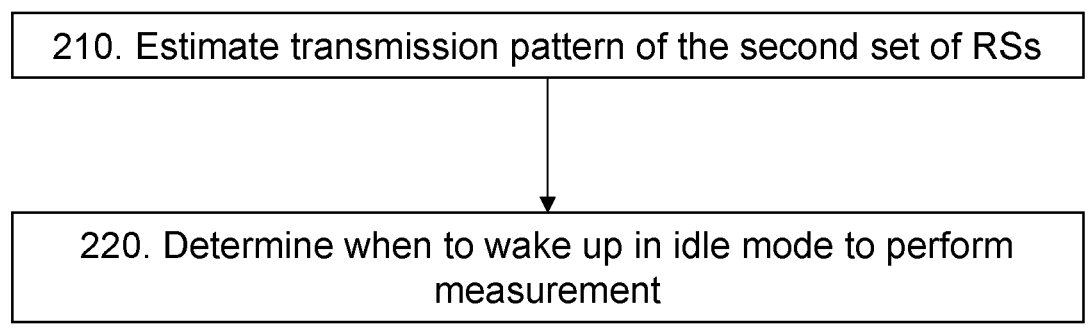
FIG. 2 is a flow chart illustrating a method performed in a UE according embodiment herein.

A method performed in a UE 130 according to embodiments herein for power savings in a wireless communication system 100 will be described with reference to FIG. 2. Transmissions of a first set of reference symbols (RSs) such as SSBs, and a second set of RSs, such as TRS, CSI-RS etc. non-SSB RS are provided in the wireless communication system 100. The method comprises the following actions:

Action 210

The UE 130 estimates transmission pattern of the second set of RSs;

Action 220

The UE 130 determines when to wake up in the idle mode to perform associated measurements based on the estimated transmission pattern of the second set of RSs.

The associated measurements may be AGC, AFC, timing drift correction etc.

According to embodiments herein, a distinguishing is made between the above mentioned two aspects, i.e. the presence information regarding the non-SSB RSs are either explicitly provided by the NW node and thus guaranteed in specific time/frequency (T/F) resources, or it has to be detected or learned by the UE itself. Mechanisms with which the UE may be able to exploit the non-SSB RSs during RRC_Idle/Inactive mode for power saving under each aspect are provided.

In the remaining text, the terms NW, network node, base station and gNB are used interchangeably. Furthermore, when referring to UE being in idle mode, it means the UE is in RRC_Idle or Inactive state. Additionally, for the sake of simplicity the example embodiments focus on Tracking reference signals (TRS) as a specific non-SSB RS. Nevertheless, the same concept and mechanisms can be readily extended to other non-SSB RSs, e.g., CSI-RS.

In the following, example embodiments of UE exploiting the presence of non-SSB RSs for power savings are described.

In one embodiment, the UE after confirmation that the non-SSB RSs, or a subset of them, e.g., TRS is present during idle time, the UE may exploit this information to optimize its different procedures, e.g., AGC, T/F synchronization and so on. Particularly, the UE may use this information to achieve power savings.

In one example, the UE may note that the non-SSB RS, e.g. TRS is closer to a PO than SSB, and thus it may decide to skip the SSB measurement, and directly wake-up and measure the TRS before PO, e.g. for the purposes of coarse T/F synchronization. As such the UE may deep-sleep for a longer time and thus achieve a higher power saving.

In another example, the UE may note that there is a TRS closer to a SSB than another SSB, let's say TRS is between SSB1 and SSB2, with SSB2 being the closest SSB to PO, and thus instead of waking up for SSB1 for AGC, the UE may skip SSB1, and wake-up for TRS for AGC before SSB2 for measurement. Again, the UE may sleep longer and thus achieve a higher power savings, or consume lower energy. In a related example, the TRS occasion may be after SSB2, and in this case the UE may decide to skip SSB1 for AGC based on the probability of TRS being present after SSB1. For example, if the probability is high or higher than a threshold, the UE skips SSB1 for AGC, perform AGC on SSB2, and AFC on TRS, and in the worst case if TRS is not present, in the next PO, it only relies on SSB. Nevertheless, if the probability is not high enough e.g. lower than a threshold, then the UE may only rely on SSB.

In another embodiment, and particularly when the non-SSB RS consist of multiple slots, e.g. TRS with two consecutive slots, the UE may decide to perform both AGC and AFC on the same TRS if there is sufficient time between the slots for reliable AGC/AFC, and then skip all the SSBs. Here again, for the sake of robustness, the UE may decide to choose the TRS before or after the latest SSB before PO based on the probability of TRS being present.

In another embodiment, the UE may decide to use the detection result in Alternative 2 directly. That is if the detection result shows that in a specific T/F component, a non-SSB RS is present, then the UE may decide to perform a measurement on this RS directly, and skip the immediate SSB measurement. In a related realization, the UE may first use a low-power detector to detect the non-SSB RS, and then use the full receiver if needed for additional operations, e.g. synchronization and so on.

Depending how the UE obtains the information on the transmission of the second set of RSs, the method performed in a UE 130 according to embodiments herein for power savings are described in the following two aspects.

Aspect 1: UE exploitation of guaranteed non-SSB RS during idle mode for power saving.

According to some embodiments, the UE receives the information on the transmission of the second set of RSs from a network node. Herein, it is assumed that the UE has been provided by the NW node with the information regarding the resources within which the second set of RSs, e.g. TRS, is present during idle mode and explicit or implicit information that the second set of RSs, e.g. TRS, will be available during some time interval forward. The configuration information may include the T/F locations, Resource Element (RE) pattern in the symbol(s), period, code sequence, associated Transmission Configuration Indication (TCI) state, etc. in general all parameters required for detecting, measuring, or otherwise utilizing the second set of RSs, e.g. TRS, signal by the UE. As such the UE has an accurate knowledge about the presence of the second set of RSs, e.g. TRS, in idle mode.

In one class of embodiments, the UE may determine whether and how to utilize the second set of RSs, e.g. TRS, based on the temporal order of occurrence of the first and second set of RSs, and/or Paging Occasion, PO, positions, e.g. the temporal order of occurrence of SSB, TRS, and paging PDCCH signals in the vicinity of a PO.

According to some embodiments, the UE may determine sleeping mode based on the temporal order of occurrence of the first and second set of RSs.

Figure 3:
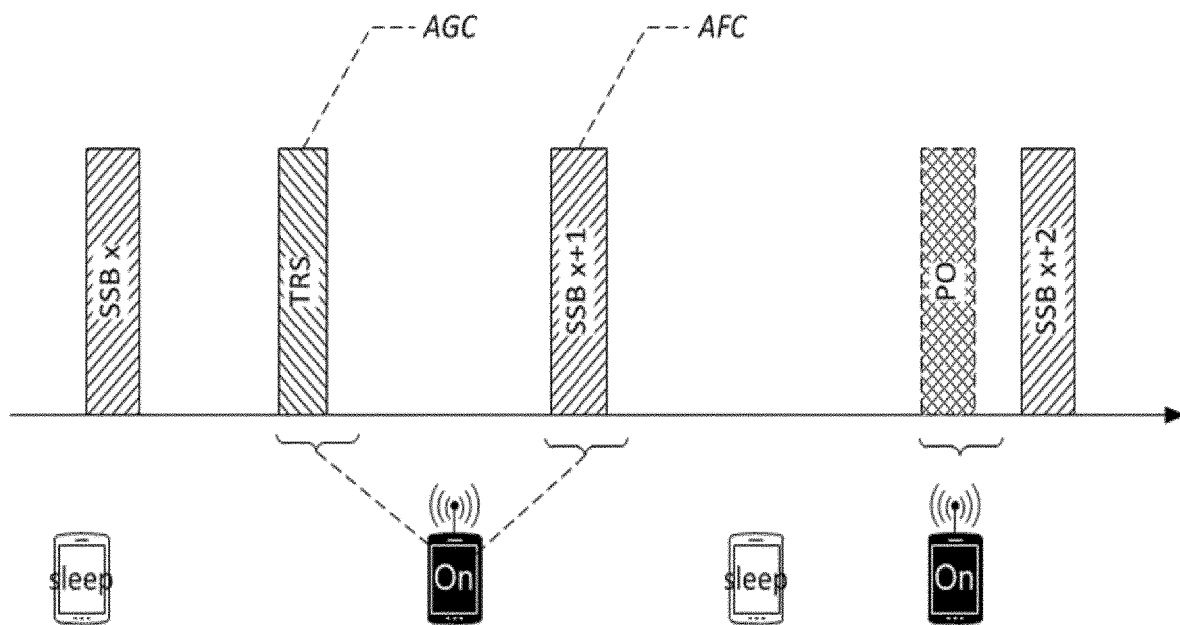
FIG. 3 illustrating one example scenario of reference symbols positions.

In one embodiment, the TRS is located between two SSBs, namely SSB occasion x, called SSB_x hereafter, and SSB occasion x+1, called SSB_x+1 hereafter, as shown in FIG. 3, with SSB_x+1 being the one closest to a UE's paging occasion (PO). As such the UE may decide to exploit TRS for AGC and SSB_x+1 for AFC, thereby skipping SSB_x, and staying in a radio deep sleep state for a longer time before waking up for TRS measurements. Furthermore, depending on the amount of available time between TRS and SSB_x+1, or SSB_x+1 and PO, the UE may decide to choose the appropriate sleeping mode, e.g., a light or a micro sleep. Note that paging is just one example. PO may be any type of UE activity that requires the UE to have proper reception level, i.e. AGC is needed, and synchronization towards the network node with regarding to frequency and timing, i.e. AFC is needed. Other examples may be broadcast or multi-cast Channel reception, PRACH transmission etc.

Figure 4:
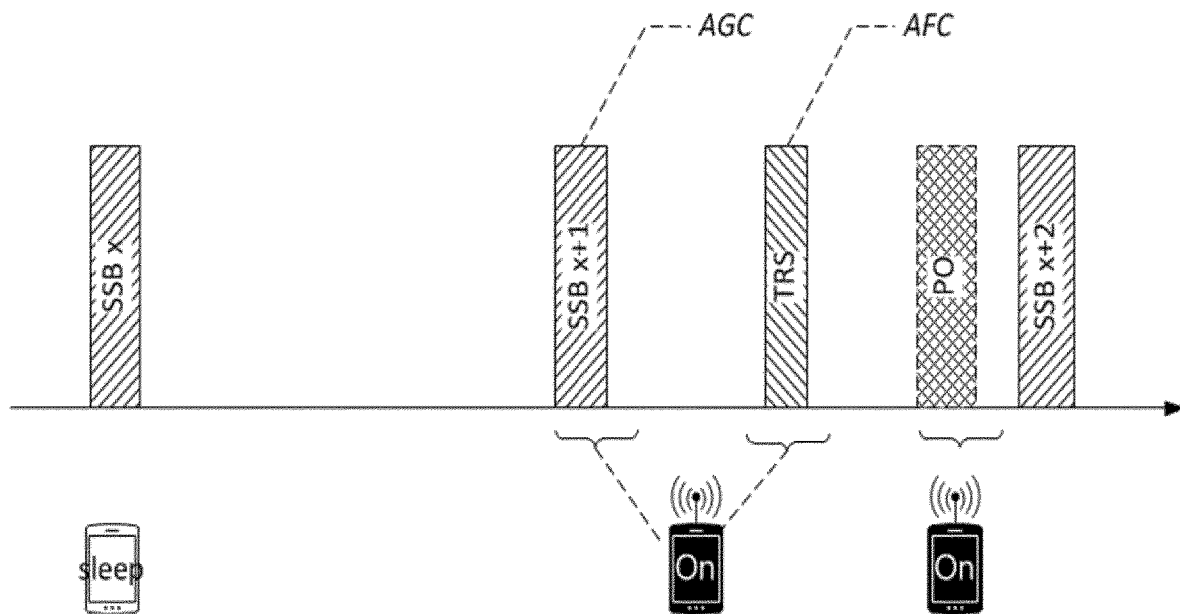
FIG. 4 illustrating another example scenario of reference symbols positions.

In another embodiment, as depicted in FIG. 4, out of available reference symbols, TRS may be the closest to PO. As such, the UE may again skip SSB_x, but wake up for SSB_x+1 to perform AGC, and then using TRS for AFC. Again in this case, the UE may deep sleep for a longer time by skipping SSB_x, and then based on the available time between SSB_x+1 and TRS, and TRS and PO, choose an appropriate power saving mode.

Figure 5:
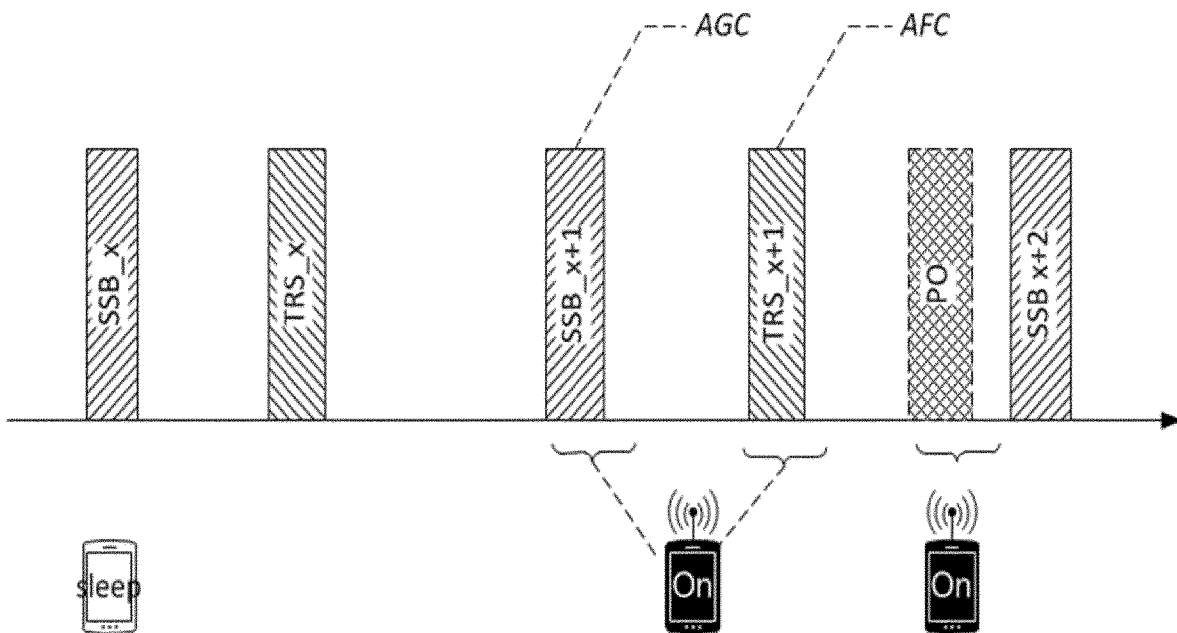
FIG. 5 illustrating another example scenario of reference symbols positions.

In another embodiment, as depicted in FIG. 5, the UE may have an order of occurrences as SSB_x, TRS_x, SSB_x+1, TRS_x+1, PO. In this case, if the distance between SSB_x+1 and TRS_x+1 is sufficiently distanced to enable a consecutive AGC, AFC, in addition to SSB_x, the UE may also skip TRS_x, and thus stay longer in deep sleep, before waking up for SSB_x+1 and TRS_x+1 measurements or processing.

Figure 6:
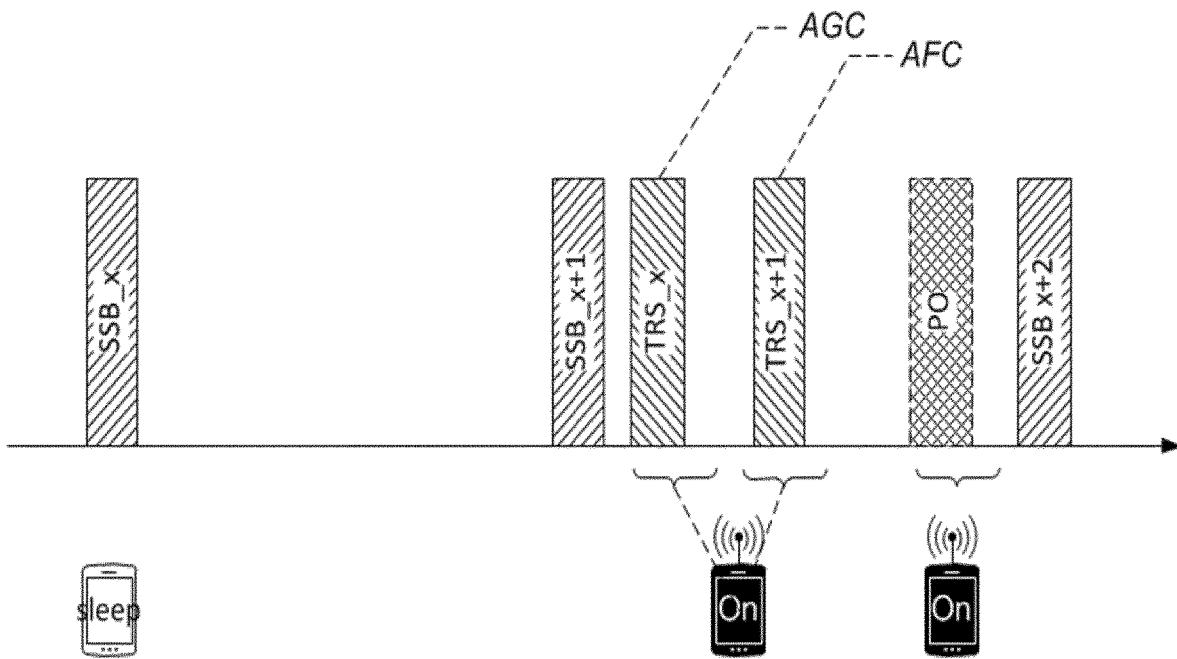
FIG. 6 illustrating another example scenario of reference symbols positions.

In another embodiment, as depicted in FIG. 6, the order of occurrences may be SSB_x, SSB_x+1, TRS_x, TRS_x+1, and thus the UE can skip both SSB_x and SSB_x+1, if temporally TRS_x and TRS_x+1 are sufficiently distanced from each other for AGC/AFC operation.

Figure 7:
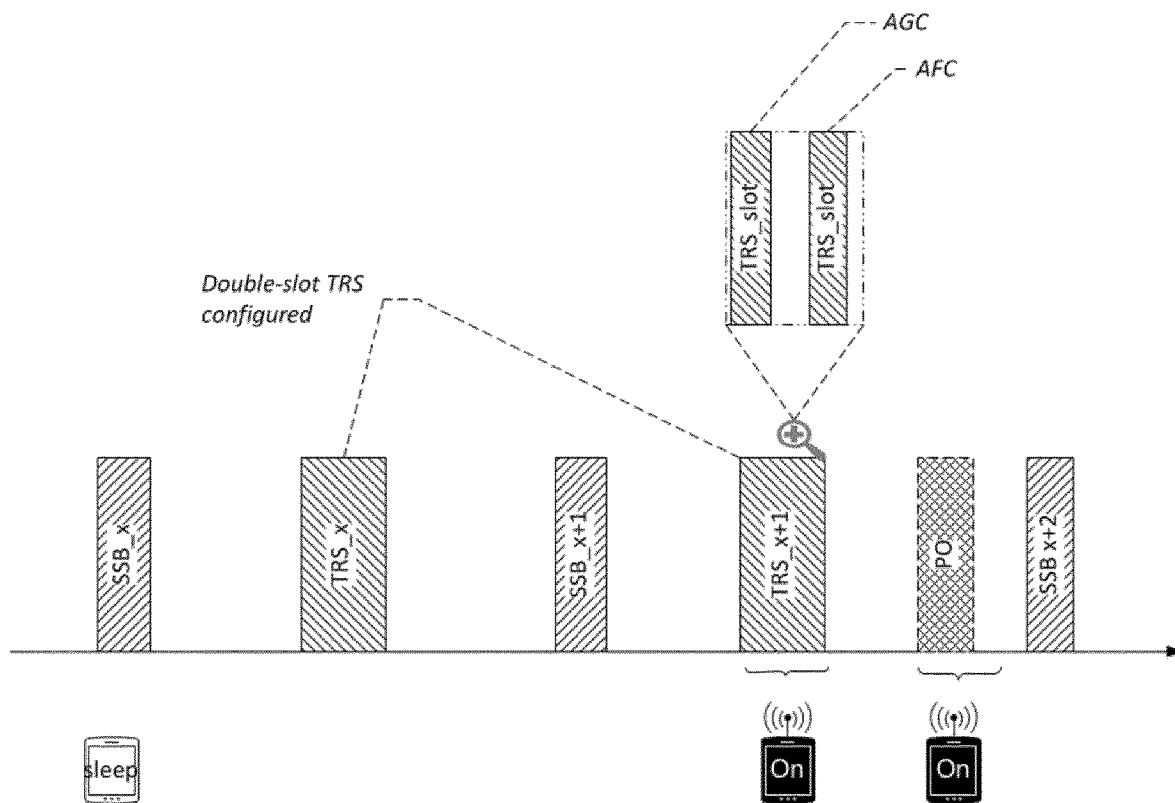
FIG. 7 illustrating another example scenario of reference symbols positions.

In another embodiment, if the TRS consist of two slots, and the slot duration is sufficiently large for a reliable AGC, AFC operation, the UE may skip all other SSB and TRSs and use the same TRS for both AGC and AFC respectively associated each with one slot. In this case, the closest TRS to PO can be used to let the UE deep sleeping for a longer time. This is depicted in FIG. 7.

In another embodiment, as one TRS slot contains 2 TRS symbols with a fixed inter symbol distance of 4, UE can exploit the 1st symbol for AGC and the 2nd symbol for AFC. Therefore, in FIG. 3 and FIG. 4, the SSB reception can be skipped.

In another embodiment, in FIG. 3 and FIG. 4, UE can perform AGC and coarse time/frequency synchronization by receiving SSB, while perform finer time/frequency correction by using TRS.

In general, the signal or signal component used for AGC tuning may also be used for link quality estimation, e.g. serving cell Reference signal received power (RSRP) or Signal to Interference and Noise Ratio (SINR). The measurement result may be determined as a scaled output of a correlator determined as magnitude of inner product of the received RE contents and a reference sequence based on the TRS or SSS contents. In embodiments where the TRS is used for measurement purposes, the TRS-based measurement result must be made consistent with the conventional SSB-based, e.g. Secondary Synchronization Signal (SSS)-based, measurements for comparing with other-cell SSB quality values; raw measurements are generally not consistent since the TRS and SSS have a different number of REs and may have different power boosting applied by the gNB. The UE may employ one of the following approaches to achieve appropriate scaling:

Perform measurements with regarding to its serving cell based on the SSB, e.g. SSS, and on the TRS and determine a scaling factor as the ratio of the two. One measurement or an average of multiple measurements with both signals during the same time interval may be used to determine the ratio. The TRS-based power estimate is then scaled by multiplying it by the scaling factor.

Estimate the relative power values of TRS REs and SSS REs during one or more measurements and determine the number of REs used for estimating the power of the two signals. The TRS-based power estimate is then scaled by multiplying it by the ratio of "the number of SSB REs times the SSB RE power" and "the number of TRS REs times the TRS RE power".

The UE then uses the scaled power estimate for comparison with other-cell link quality estimates.

According to some embodiments herein, the UE may determine RS utilization sequences for idle mode tasks by comparing the total energy consumption of the utilization sequences of the first and second sets of RSs.

Figure 8:
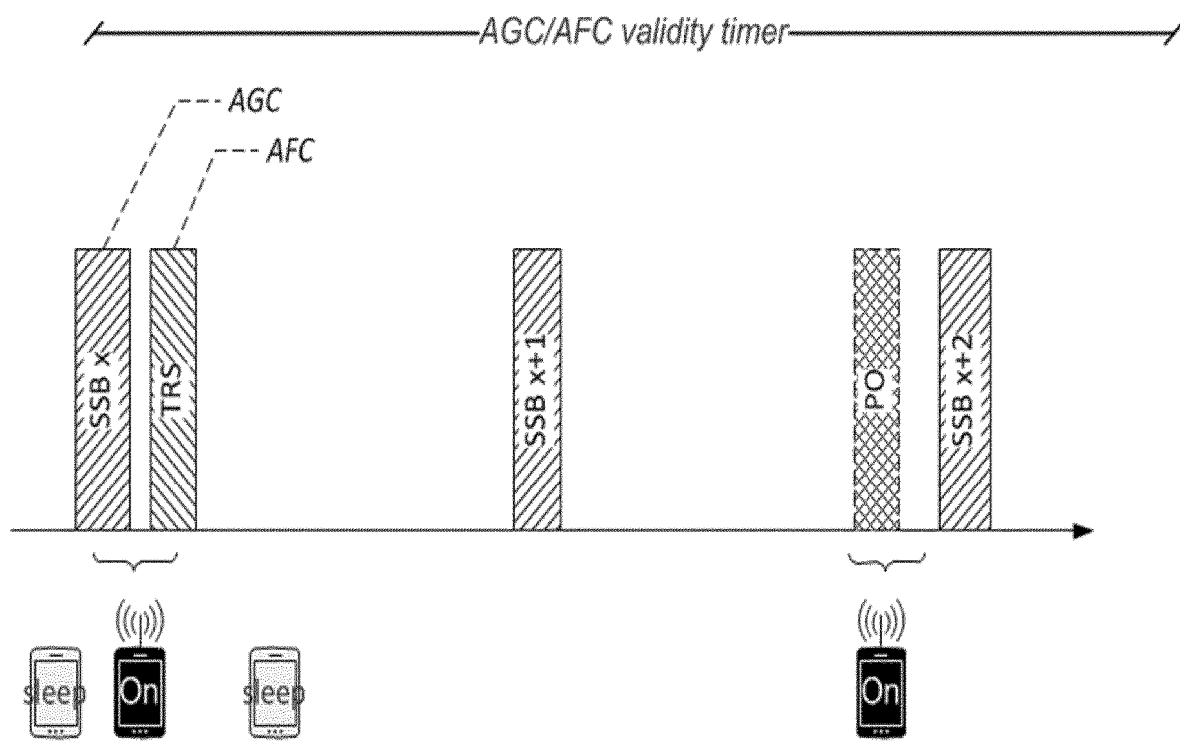
FIG. 8 illustrating another example scenario of reference symbols positions.

The previously presented examples of TRS utilization primarily consider the temporal order of the available signals. In a more generic embodiment, the UE also uses the detailed inter-signal distance information to predict sleep opportunities, including selection of best available sleep mode and accounting for the transition intervals between sleep- and non-sleep states. The UE may determine whether the available non-SSB RS may be advantageously used by comparing the total energy consumption of the baseline and alternative, e.g. non-SSB RS-aided, action sequences. The total energy estimate may include all estimated sleep, transition, and activity phases of a given candidate RS utilization sequence. Multiple candidate sequences may be analyzed and the sequence with least total energy metric may be selected. For example, as shown in FIG. 8, SSB_x and TRS might be so close to each other, and yet close enough to the PO so that AGC/AFC estimates on the two can be assumed valid at PO, so that it is more beneficial to perform AGC/AFC on SSB_X/TRS rather than on the closest RSs, i.e. TRS, SSB_X+1, to the PO. Reason for this is that the UE may enjoy a longer total sleep time before the PO.

In an extension of the above embodiment, the UE further considers the current operating parameters when considering candidate sequences for RS utilization, including e.g.

validity of available AGC estimate from previous wake-up, depending on e.g. the time since the last AGC update, previously estimated variability of the RSSI metric over time in the network, etc. If time passed or the variability exceeds predetermined threshold values, a new AGC estimate must be accommodated by a candidate sequence.

validity of current AFC and/or timing estimate, depending on e.g. the time since the last AFC update, if time passed exceeds a predetermined threshold value, a new AFC and/or timing reference estimate must be accommodated by a candidate sequence.

signal quality of the available RS, at higher SINR, a smaller number of REs are required for reliable AFC and/or measurement operations.

Aspect 2: UE exploitation of probable non-SSB RS during idle mode for power saving According to some embodiments, the UE detects the transmission pattern of the second set of RSs by learning mechanism. In this case the UE is aware of TRS presence during idle mode with a certain probability but not guaranteed. For example, the UE has used some learning mechanism to learn the pattern within which the TRS are transmitted, and then detects that the same patterns are repeated in Idle/Inactive modes. As in the case of any detection, and/or learning mechanism such an awareness is associated with a non-zero probability of erroneous estimation. Alternatively, the UE may have detected the TRS during a current or preceding TRS occasion in idle/inactive but has no information or guarantees that the TRS will continue to be available for a certain time interval forward.

According to some embodiments, the UE may test for the presence of non-SSB RS in idle mode even when it has not obtained or learned RS configuration info in connected mode in the given cell, e.g. blind detection. This approach may be used if the UE is mobile and changes its camping cell so that the current camping cell is no longer the last connected-mode cell for the UE. In such case, the UE utilizes its gained knowledge for example as of Aspect 1, e.g. with respect to scrambling sequences assumed to be used for the new cell in case the scrambling sequence was based on cell identity. In one embodiment, the UE may attempt detecting the presence of RS in T/F locations and transmission patterns and/or according to scrambling and other resource set parameters or parameter combinations that were valid in its previous serving cells. If the previous serving cells had multiple different RS configurations, the UE may attempt to perform detection according to multiple or all previously encountered patterns. In another embodiment, the UE may use the code info from previous serving cells but attempt detection in a wider range of T/F resource sets, e.g. in a given symbol number of multiple or all slots. The UE may perform energy detection to identify symbols where the RS are likely transmitted and attempt correlation detection in symbols whose energy level or detected energy pattern matches the expected RS energy or pattern.

According to some embodiments, the UE determines which RS to use for idle mode tasks is based on the available probability of the second set of RSs and paging occasion pattern.

In one embodiment, if the probability of TRS presence according to the learned pattern is high, the UE may consider this as guaranteed and employ mechanisms similar to the ones described in Aspect 1. Possible rare occurrences of erroneous estimation are handled as failed paging reception and conventional recovery approaches are used in the NW. Furthermore, for robustness issues, the UE may employ TRS detection in every occasion, or in every other one and so on, to make sure the measured signal is actually TRS. In this case, in one approach, the UE may employ a joint detection and estimation mechanism, to jointly detect TRS, and then apply AGC/AFC. In another approach, and particularly when each TRS spans more than one slot, the UE may use the first slot to detect the TRS, potentially with a lower power radio, and then apply AGC/AFC if the TRS detected. In case a TRS not detected, and there is no other RS to employ for AGC/AFC operation, then the UE may skip one PO. As such, when deciding about the probability of TRS being present, in one approach, the UE may make sure to choose the probability such that the specified maximum probability of missing a PO is not exceeded. For example, the UE might learn the paging policy/pattern of the NW and observe that the NW pages a UE at least say three times before giving up. Hence, the UE might take a larger risk initially and base its AGC/AFC tuning on potential TRSs before a PO or couple of POs in this example. However, once the UE detects missing TRS, it may adapt its risk assessment and not perform AGC/AFC tuning on potential TRS. But after a successful paging procedure, or alternately after immediate connection release to idle/inactive, since the UE knows that it has not missed any paging since last connection, again the UE may start taking a larger risk and based AGC/AFC on potentially present TRSs.

In another embodiment, if the probability of TRS presence is low, or lower than a specific threshold, e.g., the probability which was set in the previous embodiment, the UE may choose to only employ TRS occasions before SSB for power savings purposes in order to have an opportunity to use the SSB should the TRS not be present. For example, if the order of RSs, is as depicted in FIG. 3, SSB_x, SSB_x+1, TRS, PO, the UE may just rely on the SSBs for AGC/AFC operation and ignore TRS, since if it relies on TRS, e.g., for AFC, and then there is no TRS, it may not reliably decode PO.

Alternatively, the UE may still employ this TRS for power saving purposes, but if not detected, employ a more powerful receiver for PO monitoring to make sure not missing the paging message.

In another example, as depicted in FIG. 4, if the order of appearance is SSB_X, TRS_x, SSB_x+1, TRS_x+1, PO, the UE may use SSB_x for AGC, and then TRS_x for AFC and skip SSB_x+1/TRS_x+1, and in case TRS_x is not detected, the UE may use SSB_x+1 as a fallback for AFC. In other words, the UE might take the risk of utilizing those TRSs that allow for backup/fallback to available SSBs before the PO in case the TRS was not present. In another example, the order of appearance may be TRS, SSB_x, SSB_x+1, and PO. In this case, if TRS occasion spans at least two slots, and further the AGC/AFC validity remains in place until PO, the UE may use two slots of TRS for AGC/AFC, and skip both SSBs, and if TRS is not detected, then the UE may use the default operation on the two SSBs.

Figure 9:
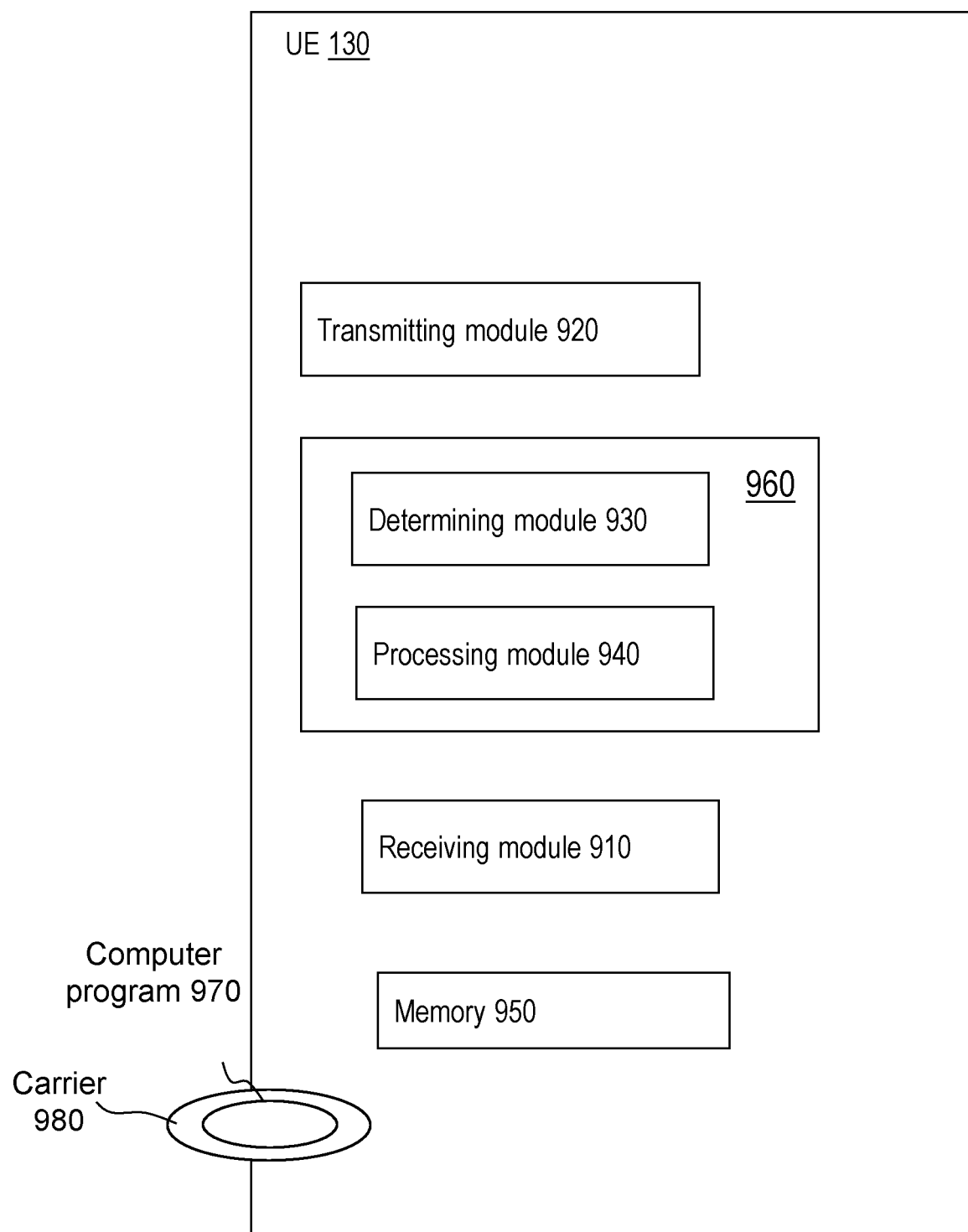
FIG. 9 is a schematic block diagram illustrating one embodiment of a UE.

To perform the method in the UE 130, the UE 130 comprises modules as shown in FIG. 9. The UE 130 comprises a receiving module 910, a transmitting module 920, a determining module 930, a processing module 940, a memory 950 etc. The determining module 930 and processing module 940 may be combined as one module, shown as processor 960.

The method according to embodiments herein may be implemented through one or more processors, such as the processor 960 in the UE 130 together with computer program code for performing the functions and actions of the embodiments herein. The program code mentioned above may also be provided as a computer program product, for instance in the form of a data carrier 980 carrying computer program code 970, as shown in FIG. 9, for performing the embodiments herein when being loaded into the UE 130. One such carrier may be in the form of a CD ROM disc. It is however feasible with other data carriers such as a memory stick. The computer program code may furthermore be provided as pure program code on a server or a cloud and downloaded to the UE 130. The memory 950 in the UE 130 may comprise one or more memory units and may be arranged to be used to store received information, measurements, data, configurations and applications to perform the method herein when being executed in the UE 130.

Some example Embodiments numbered 1-17 are described below.

Embodiment 1: A method performed in a UE for power saving in idle mode in a wireless communication system, wherein transmissions of a first set of reference symbols, RSs, and a second set of RSs are provided in the wireless communication system, the method comprising:
estimating transmission pattern of the second set of RSs;
determining when to wake up in the idle mode to perform associated measurements based on the estimated transmission pattern of the second set of RSs.

Embodiment 2: The method according to Embodiment 1, further comprises receiving information on provision schedule for the second set of RSs during connected mode from a network node, and wherein estimating transmission pattern of the second set of RSs is based on the received information.

Embodiment 3: The method according to Embodiment 2, wherein estimating transmission pattern of the second set of RSs comprises detecting if the second set of RSs are present during idle mode.

Embodiment 4: The method according to Embodiment 3, wherein detecting if the second set of RSs are present during idle mode comprises waking up a lower power receiver at an expected arrival time of the second set of RSs to detect the presence or absence of the second set of RSs.

Embodiment 5: The method according to Embodiments 3-4, wherein detecting if the second set of RSs are present during idle mode comprises correlating a received signal sample sequence with a reference sequence corresponding to an RS in the second set of RSs in time or frequency domain to verify if a RS is present or not.

Embodiment 6: The method according to Embodiments 3-4, wherein detecting if the second set of RSs are present during idle mode comprises correlating with several assumed RS sequences modified based on any one of time offset, frequency offset or vehicular speed.

Embodiment 7: The method according to Embodiments 3-6, wherein detecting if the second set of RSs is present during idle mode is performed one or more times in different cells, BWPs, beams, or FR ranges based on time and/or location.

Embodiment 8: The method according to Embodiments 3-6, wherein detecting if the second set of RSs is present during idle mode is based on the second set of RSs configuration parameters in its previous serving cells.

Embodiment 9: The method according to Embodiments 3-8, wherein detecting if the second set of RSs is present during idle mode is based on energy detection to identify symbols where the second set of RSs are likely transmitted.

Embodiment 10: The method according to Embodiments 3-9, wherein detecting if the second set of RSs is present during idle mode is based on correlating energy detections in symbols to decide if detected energy level or detected energy pattern matches an expected RS energy or pattern.

Embodiment 11: The method according to any one of Embodiments 1-10, wherein determining when to wake up to perform associated measurements comprises optimizing AGC, AFC, time and/or frequency synchronization procedures for power savings based on the transmission pattern of the second set of RSs.

Embodiment 12: The method according to any one of Embodiments 1-11, wherein determining when to wake up to perform associated measurements comprises optimizing sleeping mode based on the temporal order of occurrence of the first and second set of RSs.

Embodiment 13: The method according to any one of Embodiments 1-11, wherein determining when to wake up to perform associated measurements comprises determining which RS to use for idle mode tasks based on the temporal order of occurrence of the first and second set of RSs, and/or Paging Occasion, PO, position.

Embodiment 14: The method according to any one of Embodiments 1-13, wherein the transmission pattern of the second set of RSs comprises time and frequency locations, Resource Element (RE) pattern in symbol(s), period, code sequence, associated Transmission Configuration Indication (TCI) state of the second set of RSs.

Embodiment 15: The method according to any one of Embodiments 1-14, wherein the first set of RSs comprising Synchronization Signal Blocks, SSBs, and are transmitted periodically, and the second set of RSs are transmitted in addition to the SSBs to support connected mode UE operation.

Embodiment 16: The method according to any one of Embodiments 1-15, wherein the second set of RSs comprises a Tracking reference symbol, TRS.

Embodiment 17: The method according to any one of Embodiments 1-15, wherein the second set of RSs comprises a Channel State Information-Reference Signal, CSI-RS.

The invention claimed is:

1. A method performed in a wireless communication device for power saving when operating in idle mode in a wireless communication system, transmissions of a first set of reference symbols, RSs, and a second set of RSs being provided in the wireless communication system, the method comprising:
estimating transmission pattern of the second set of RSs by detecting presence or absence of the second set of RSs during idle mode;
determining when to wake up in idle mode to perform associated measurements based on the estimated transmission pattern of the second set of RSs;
the first set of RSs are provided periodically, and the second set of RSs are provided in any of periodic, semi-persistent or aperiodic transmission patterns;
the first set of RSs comprising Synchronization Signal Blocks, SSBs, and the second set of RSs comprising non-SSBs; and
the wireless communication device comprising a main receiver and a receiver operating at a lower power than the main receiver, and the detecting the presence or the absence of the second set of RSs during idle mode comprises waking up the receiver operating at the lower power than the main receiver of the wireless communication device at an expected arrival time of the second set of RSs.

2. The method according to claim 1, further comprising receiving information on provision schedule for the second set of RSs during operation in connected mode from a network node, and wherein the estimating of the transmission pattern of the second set of RSs is based on the received information.

3. The method according to claim 1, wherein the detecting the presence or the absence of the second set of RSs during idle mode comprises correlating a received signal sample sequence with a reference sequence corresponding to an RS in the second set of RSs in time or frequency domain to verify whether an RS is present or not.

4. The method according to claim 1, wherein the detecting the presence or the absence of the second set of RSs during idle mode comprises correlating with several RS sequences, assumed to belong to the second set, modified based on any one of time offset, frequency offset or speed.

5. The method according to claim 1, wherein the detecting the presence or the absence of the second set of RSs during idle mode is performed one or more times in different cells, bandwidth parts, BWPs, beams, or frequency ranges based on one or more of time and location.

6. The method according to claim 1, wherein the detecting the presence or the absence of the second set of RSs during idle mode in a present cell is based on the second set of RSs' configuration parameters in previous serving cells.

7. The method according to claim 1, wherein detecting the presence or the absence of the second set of RSs during idle mode comprises blind detection.

8. The method according to claim 1, wherein the detecting the presence or the absence of the second set of RSs during idle mode is based on energy detection to identify symbols where the second set of RSs are likely transmitted.

9. The method according to claim 1, wherein detecting the presence or the absence of the second set of RSs during idle mode is based on correlating energy detections in symbols to decide whether detected energy level or detected energy pattern matches an expected RS energy or pattern.

10. The method according to claim 1, wherein the determining when to wake up to perform associated measurements comprises adjusting one or more of automatic gain control, AGC, automatic frequency control, AFC, time and frequency synchronization procedures for power savings based on the transmission pattern of the second set of RSs.

11. The method according to claim 1, wherein the determining when to wake up to perform associated measurements is based on occurrences of the RSs of the first and the second sets.

12. The method according to claim 1, wherein the determining when to wake up to perform associated measurements comprises adjusting sleeping in the idle mode based on a temporal order of occurrence of the first and second set of RSs.

13. The method according to claim 1, wherein the determining when to wake up to perform associated measurements comprises determining which RS to use for idle mode tasks based on a temporal order of occurrence of the first and second set of RSs, and occurrence of a Paging Occasion, PO.

14. The method according to claim 1, wherein the transmission pattern of the second set of RSs comprises one or more of time and frequency allocations, Resource Element, RE, pattern in symbol(s), period, code sequence, associated Transmission Configuration Indication, TCI, state of the second set of RSs.

15. A wireless communication device for a wireless communication, transmissions of a first set of reference symbols, RSs, and a second set of RSs being provided in a wireless communication system, the wireless communication device comprising a receiver, a transmitter, and a first processor which comprise a determiner, and a second processor, to configure the wireless communication device to:
   estimate transmission pattern of the second set of RSs by detecting presence or absence of the second set of RSs during idle mode;
   determine when to wake up in idle mode to perform associated measurements based on the estimated transmission pattern of the second set of RSs;
   the first set of RSs are provided periodically, and the second set of RSs are provided in any of periodic, semi-persistent or aperiodic transmission patterns;
   the first set of RSs comprising Synchronization Signal Blocks, SSBs, and the second set of RSs comprising non-SSBs; and
   the wireless communication device comprising a main receiver and a receiver operating at a lower power than the main receiver, and the detecting the presence or the absence of the second set of RSs during idle mode comprises waking up the receiver operating at the lower power than the main receiver of the wireless communication device at an expected arrival time of the second set of RSs.

16. The method according to claim 3, wherein the detecting the presence or the absence of the second set of RSs during idle mode is performed one or more times in different cells, bandwidth parts, BWPs, beams, or frequency ranges based on one or more of time and location.

17. The method according to claim 3, wherein the detecting the presence or the absence of the second set of RSs during idle mode in a present cell is based on the second set of RSs' configuration parameters in previous serving cells.

18. The method according to claim 3, wherein detecting the presence or the absence of the second set of RSs during idle mode comprises blind detection.

19. The method according to claim 3, wherein the detecting the presence or the absence of the second set of RSs during idle mode is based on energy detection to identify symbols where the second set of RSs are likely transmitted.

20. The method according to claim 3, wherein detecting the presence or the absence of the second set of RSs during idle mode is based on correlating energy detections in symbols to decide whether detected energy level or detected energy pattern matches an expected RS energy or pattern.

* * * * *